United States Patent
Boucher

(10) Patent No.: US 10,921,880 B2
(45) Date of Patent: Feb. 16, 2021

(54) SYSTEM, METHOD, AND COMPUTER-READABLE MEDIUM FOR DISPLAYING VIRTUAL IMAGE BASED ON POSITION DETECTED BY SENSOR

(71) Applicant: GREE, INC., Tokyo (JP)

(72) Inventor: Robin Boucher, Tokyo (JP)

(73) Assignee: GREE, INC., Tokyo (JP)

( * ) Notice: Subject to any disclaimer, the term of this patent is extended or adjusted under 35 U.S.C. 154(b) by 0 days.

(21) Appl. No.: 16/544,365

(22) Filed: Aug. 19, 2019

(65) Prior Publication Data

US 2020/0064908 A1 Feb. 27, 2020

(30) Foreign Application Priority Data

Aug. 21, 2018 (JP) .............................. JP2018-154384

(51) Int. Cl.
*G06F 3/01* (2006.01)
*A63F 13/213* (2014.01)

(52) U.S. Cl.
CPC ............ *G06F 3/011* (2013.01); *A63F 13/213* (2014.09)

(58) Field of Classification Search
CPC ...... G06F 3/011; A63F 13/213; A63F 13/211; A63F 13/25; A63F 13/428; A63F 13/5255; A63F 13/212

See application file for complete search history.

(56) References Cited

U.S. PATENT DOCUMENTS

| | | | |
|---|---|---|---|
| 2002/0004422 A1 | 1/2002 | Tosaki et al. | |
| 2002/0183961 A1* | 12/2002 | French | A63F 13/10 73/379.04 |
| 2009/0322763 A1* | 12/2009 | Bang | G06K 9/00342 345/474 |
| 2010/0113153 A1* | 5/2010 | Yen | A63F 13/212 463/37 |
| 2015/0258432 A1* | 9/2015 | Stafford | A63F 13/5255 463/32 |

FOREIGN PATENT DOCUMENTS

JP H10-214155 A 8/1998

* cited by examiner

*Primary Examiner* — Ryan A Lubit
(74) *Attorney, Agent, or Firm* — Oliff PLC

(57) ABSTRACT

A system for displaying an image of a virtual space on a display obtains detection data from position detection sensors, the position detection sensors including a position detection sensor attached to a user. The system calculates a distance between a pair of the position detection sensors based on the detection data, and sets, based on the distance, a boundary for determining a motion of the user. The system determines, when the motion of the user occurs, whether a positional relationship between one of the position detection sensors and the boundary satisfies a condition, and, responsive to the positional relationship satisfying the condition, executes an action corresponding to the motion of the user in the virtual space.

12 Claims, 8 Drawing Sheets

Fig.5
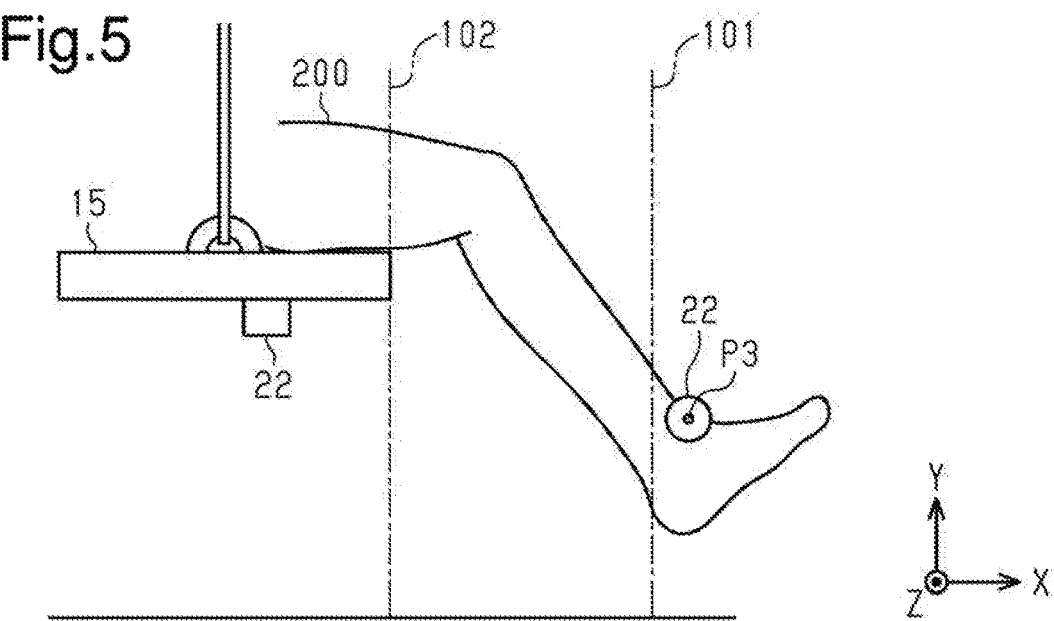
Fig.6A
| Speed | Movement Distance |
|---|---|
| 4m/s~5m/s | 10 |
| 5m/s~6m/s | 15 |
| ⋮ | ⋮ |
| ⋮ | ⋮ |
Fig.6B
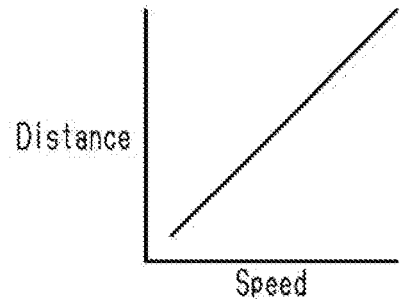
Fig.7
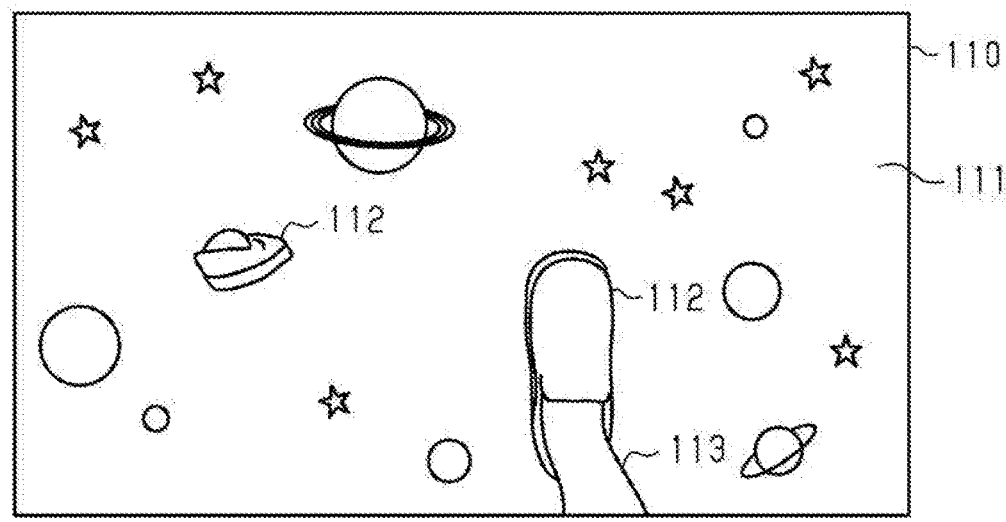

Fig.10A
Fig.10B
Fig.10C
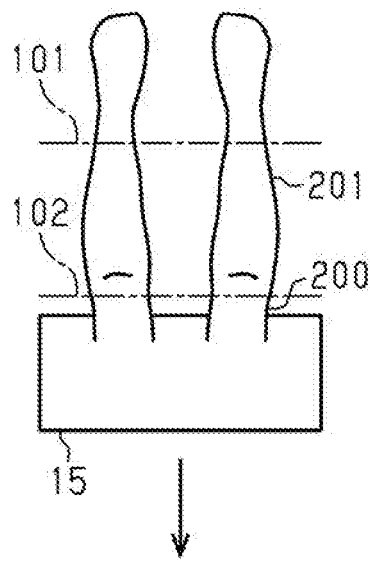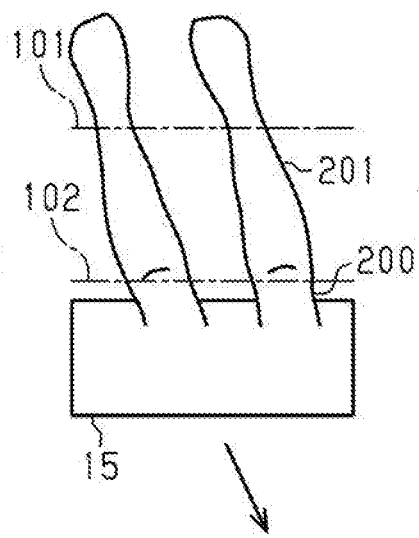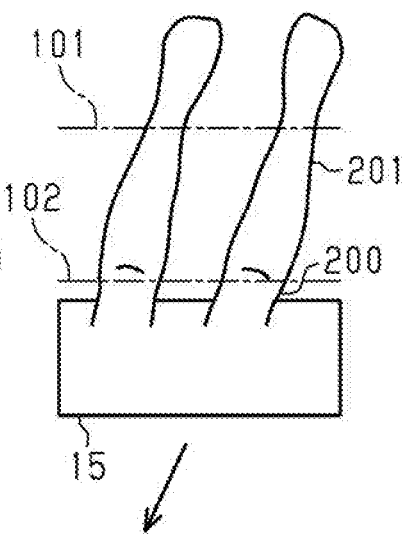

SYSTEM, METHOD, AND COMPUTER-READABLE MEDIUM FOR DISPLAYING VIRTUAL IMAGE BASED ON POSITION DETECTED BY SENSOR

This application claims the benefit of priority from Japanese Patent Application No. 2018-154384 filed Aug. 21, 2018, the entire contents of the prior application being incorporated herein by reference.

BACKGROUND

1. Field

The following description relates to a system, a method, and a computer-readable medium for displaying an image.

2. Description of Related Art

There is a known game in which the motions of a user in a real space are detected using various types of sensors or the like and reflected on objects in a virtual space. Japanese Laid-Open Patent Publication No. 10-214155 discloses an input device used for a fishing game. The input device is equipped with a sensor capable of detecting an acceleration and inclination and connected to a game processing device. With a trigger button turned on, when the input device is moved by a motion like an actual motion of casting a fishing rod, an image in which the fishing rod is being cast in a water surface is displayed on a display, which is connected to the game processing device.

In the above-described system, when the input device is moved a little with the trigger button turned on, the image in which the fishing rod is being cast in the water surface may be displayed against the user's intention. When the motion of the user in the real world deviates from the reflected image in such a manner, the user may experience discomfort.

SUMMARY

It is an objective of the present disclosure to display an image in which a user experiences less discomfort when a motion of the user is reflected on an action in a virtual space.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a system for displaying an image of a virtual space on a display is provided. The system includes circuitry configured to obtain detection data from a plurality of position detection sensors including a position detection sensor attached to a user, calculate a distance between a first position detection sensor and a second position detection sensor of the position detection sensors based on the detection data, set, based on the distance, a boundary for determining a motion of the user, determine, when the motion of the user occurs, whether a positional relationship between one of the position detection sensors and the boundary satisfies a condition, and, responsive to the positional relationship satisfying the condition, execute an action corresponding to the motion of the user in the virtual space.

In another general aspect, a method for displaying an image of a virtual space on a display using a computer including circuitry is provided. The method includes obtaining detection data from position detection sensors, the position detection sensors including a position detection sensor attached to a user, calculating a distance between a first position detection sensor and a second position detection sensor of the position detection sensors based on the detection data, setting, based on the distance, a boundary for determining a motion of the user, determining, when the motion of the user occurs, whether a positional relationship between one of the position detection sensors and the boundary satisfies a condition, and, responsive to the positional relationship satisfying the condition, executing an action corresponding to the motion of the user in the virtual space.

In a further general aspect, a non-transitory computer-readable medium that stores a program is provided. The program, when executed by a computer including circuitry, causes the circuitry to obtain detection data from position detection sensors, the position detection sensors including a position detection sensor attached to a user, calculate a distance between a first position detection sensor and a second position detection sensor of the position detection sensors based on the detection data, set, based on the distance, a boundary for determining a motion of the user, determine, when the motion of the user occurs, whether a positional relationship between one of the position detection sensors and the boundary satisfies a condition, and, responsive to the positional relationship satisfying the condition, execute an action corresponding to the motion of the user in the virtual space.

Other features and aspects will be apparent from the following detailed description, the drawings, and the claims.

BRIEF DESCRIPTION OF THE DRAWINGS

FIG. 5 is a diagram illustrating how the boundary is used in the first embodiment.

FIG. 6A is a table illustrating data used to calculate the movement distance of an object in the first embodiment.

FIG. 6B is a map illustrating data used to calculate the movement distance of an object in the first embodiment.

FIG. 7 is an exemplary view showing a game view in the first embodiment.

FIG. 10A is a diagram showing movement of the object toward the rear when the boundary is used according to a second embodiment.

FIG. 10B is a diagram showing movement of the object toward the rear right when the boundary is used in the second embodiment.

FIG. 10C is a diagram showing movement of the object toward the rear left when the boundary is used in the second embodiment.

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

This description provides a comprehensive understanding of the methods, apparatuses, and/or systems described. Modifications and equivalents of the methods, apparatuses, and/or systems described are apparent to one of ordinary skill in the art. Sequences of operations are exemplary, and may be changed as apparent to one of ordinary skill in the art, with the exception of operations necessarily occurring in a certain order. Descriptions of functions and constructions that are well known to one of ordinary skill in the art may be omitted.

Exemplary embodiments may have different forms, and are not limited to the examples described. However, the examples described are thorough and complete, and convey the full scope of the disclosure to one of ordinary skill in the art.

First Embodiment

An image processing system according to a first embodiment will now be described.

Figure 1:
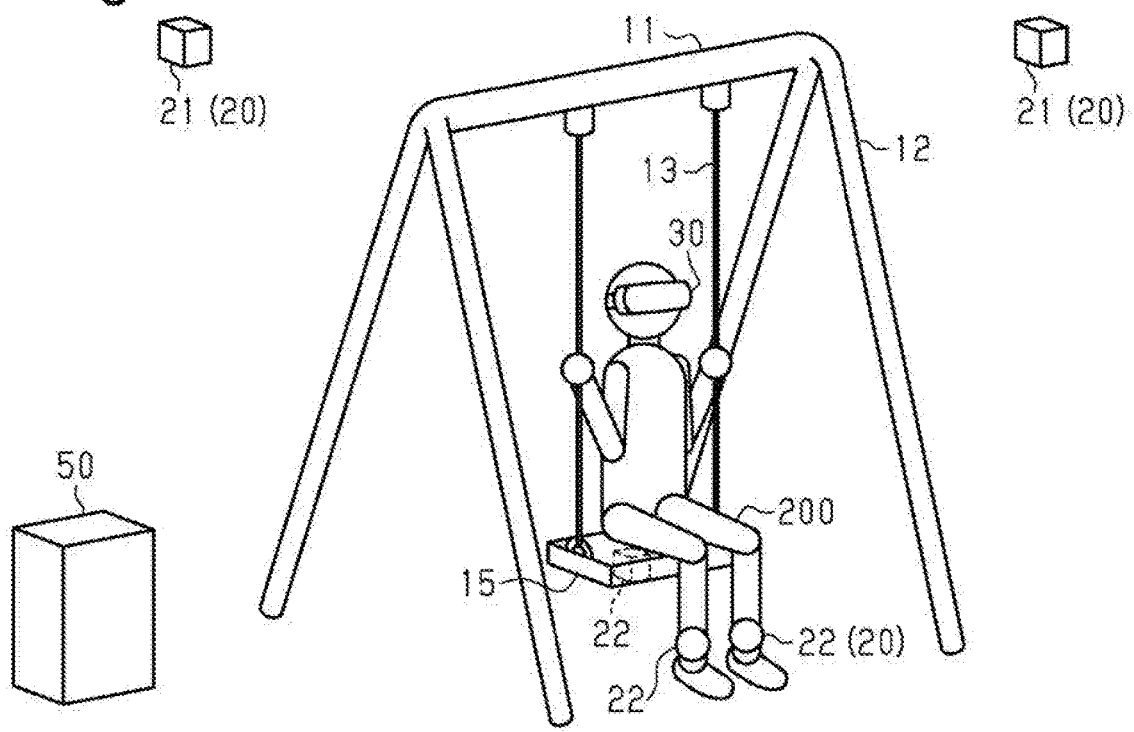
FIG. 1 is a diagram schematically showing a system of displaying an image according to a first embodiment.

As shown in FIG. 1, the image processing system includes a housing 11, a tracking system 20, a head-mounted display (HMD) 30, and a game processing device 50. The tracking system 20 includes one or more tracking assistance devices 21 and includes tracking sensors 22. The game processing device 50 corresponds to a detection data obtaining unit, a distance calculation unit, a setting unit, a determination unit, and an action execution unit. The tracking sensors 22 correspond to position detection sensors. The game processing device 50 may include a dedicated hardware circuit (for example, application specific integrated circuit: ASIC) that executes hardware processing on at least part of the processes executed by itself. That is, the game processing device 50 may be circuitry including one or more processors that operate according to a computer program (software), one or more dedicated hardware circuits that execute at least part of various processes, or a combination thereof.

The housing 11 imitates a swing. The housing 11 includes a support 12 and a seat 15, which is hung by the support 12 via a hanging portion 13. The seat 15 includes a seating surface and a rear surface, which is located on the side opposite from the seating surface. The rear surface of the seat 15 is provided with a tracking sensor 22. Further, the swinging range of the seat 15 is limited to a predetermined range such that the seat 15 does not swing greatly. For example, the hanging portion 13 or the seat 15 may be provided with a member that limits the amplitude of swing. Alternatively, the hanging portion 13 or the seat 15 may have a larger weight.

The HMD 30 is attached to the head of a user 200. The user 200 is seated on the seat 15. The tracking sensor 22 is attached around the ankle of the user 200. The position of the tracking sensor 22 does not have to be around the ankle and may be, for example, the toe or heel. The tracking sensor 22 may itself be attachable to the body of the user 200. Alternatively, the tracking sensor 22 may be attachable to the user 200 by, for example, an attachment member such as a belt.

The game processing device 50 is located in the space where the housing 11 is arranged or located at other positions. The game processing device 50 is connected to the HMD 30 via a communication cable or in a wireless manner, thereby allowing data to be transmitted and received in a bilateral direction. The game processing device 50 performs a process for displaying an image of the virtual space on the HMD 30 and causing the game to progress.

The tracking system 20 uses the tracking sensors 22 and sensors arranged in a tracking space. The tracking assistance devices 21 are located in the space where the housing 11 is arranged. The tracking assistance devices 21 and the HMD 30 cooperate to transmit, to the game processing device 50, detection data for detecting the position of the HMD 30. Further, the tracking assistance devices 21 and the tracking sensors 22 cooperate to transmit, to the game processing device 50, detection data for detecting the positions of the tracking sensors 22.

The game processing device 50 detects the motion of a foot of the user 200 seated on the seat 15 based on the data transmitted from at least one of the tracking assistance device 21 and the tracking sensor 22. The game processing device 50 detects the user's motion of, for example, moving both feet in synchronization or moving one foot at a time to determine whether the detected motion satisfies a predetermined condition. When determining that the detected motion satisfies the predetermined condition, the game processing device 50 executes, in the virtual space, a virtual action of a virtual character (avatar or character) corresponding to the user. In the present embodiment, description will be made of a game in which the user 200 performs a motion of kicking forward in the real world so that the virtual character corresponding to the user 200 executes an action of kicking away a shoe object worn on the foot frontward in the virtual space, which is referred to as a kick-the-shoe-on-the-swing motion.

Figure 2:
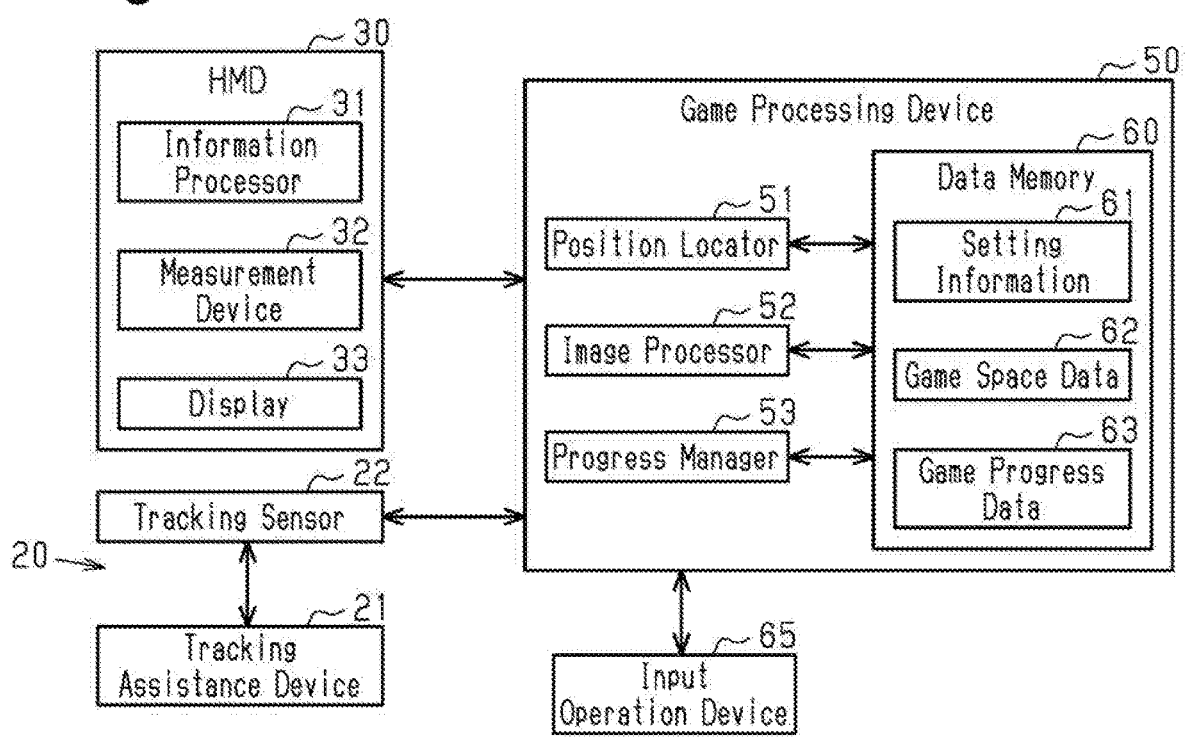
FIG. 2 is a block diagram showing the system of FIG. 1.

The HMD 30, the tracking sensor 22, and the tracking assistance device 21 will now be described in detail with reference to FIG. 2.

The HMD 30 is a wearable computer. The HMD 30 is a non-transparent display including a housing that covers both eyes or is a transparent display. The non-transparent display may display, on one or more displays, an image to be visually recognized by the left eye and an image to be visually recognized by the right eye. Alternatively, the non-transparent display may display, on a display, an image common to the left eye and the right eye. The transparent display may display, on a display, an image captured by a camera provided in a head-mounted display or another device. The display may be formed by a half mirror or made of a transparent material so that the display allows the real world to be visually recognized. The HMD 30 may be a display fixed to, for example, a housing or a frame. Alternatively, the HMD 30 may be a multi-functional telephone terminal such as a smartphone fixed to a predetermined housing in a removable manner. The HMD 30 displays an image of, for example, virtual reality (VR), augmented reality (AR), which provides content of the virtual space while causing the user to visually recognize the real world, or mixed reality (MR), which encompasses virtual and augmented reality. In the present embodiment, the HMD 30 will be described as a non-transparent display.

The HMD 30 includes an information processor 31, a measurement device 32, and a display 33. The information processor 31 executes a process for causing the game to progress. The information processor 31 is not limited to one that performs software processing on all processes executed by itself. For example, the information processor 31 may include a dedicated hardware circuit (for example, application specific integrated circuit: ASIC) that executes hardware processing on at least part of the processes executed by itself. That is, the information processor 31 may be circuitry including one or more processors that operate according to a computer program (software), one or more dedicated hardware circuits that execute at least part of various processes, or a combination thereof.

The processor includes a calculation processor such as CPU, MPU, or a GPU and includes a storage medium such as RAM or ROM. Further, the information processor 31 includes a storage medium (memory), which is storage such as hard disk drive (HDD) or solid state drive (SSD). At least one of these storage media stores program codes or instructions configured to cause the CPU to execute processes. The storage media, or computer readable media, include any type of media that are accessible by general-purpose computers and dedicated computers. The measurement device 32 is a device that detects at least the orientation of the HMD 30 and is, for example, an inertial measurement unit (IMU). The inertial measurement unit includes, for example, a gyro sensor and an acceleration sensor and detects at least one of the rotational angle, angular angle, and acceleration with respect to an X-axis, Y-axis, and Z-axis. The display 33 is, for example, an organic EL display or a liquid crystal display.

The tracking sensor 22 detects the position and orientation of the tracking sensor 22. The tracking sensor 22 includes, for example, an inertial measurement unit in the same manner as the HMD 30.

The tracking sensor 22 cooperates with multiple tracking assistance devices 21 to output signals corresponding to the position and orientation of the tracking sensor 22. The tracking sensor 22 and the tracking assistance devices 21 cooperate to detect the position of the tracking sensor 22 in the space. One example of the tracking assistance devices 21 is a multi-axis laser oscillator. In this case, the tracking assistance devices 21 are arranged diagonally on the upper side of the space where the housing 11 is arranged. The tracking assistance devices 21 emit pulse laser light. The tracking sensor 22 includes a sensor that detects laser light and detects the position and orientation of the tracking sensor 22 while performing synchronization using synchronization pulses. For example, Vive Tracker (registered trademark) and Vive Base Station (registered trademark), which are offered by HTC Corporation, can be used for the tracking sensor 22 and the tracking assistance device 21.

The game processing device 50 includes a position locator 51, an image processor 52, a progress manager 53, and a data memory 60. The position locator 51 determines the orientation of the HMD 30 based on the data obtained from at least one of the HMD 30 and the tracking assistance device 21. In addition to the orientation of the HMD 30, the position locator 51 may determine the position of the HMD 30. Further, the position locator 51 determines the orientation and position of the tracking sensor 22 based on the data obtained from at least one of the tracking sensor 22 and the tracking assistance device 21.

The image processor 52 displays an image of the virtual space on the display 33 in accordance with the orientation and position of the HMD 30 determined by the position locator 51. Further, the image processor 52 displays, as part of the virtual space, part of the body of the virtual character corresponding to the user.

The progress manager 53 manages the progress of the game and performs processes other than the ones executed by the position locator 51 and the image processor 52. The progress manager 53 starts the game when a game start condition is satisfied. For example, the game start condition is that the user or the manager of the game inputs an instruction. Further, the progress manager 53 ends the game when a game end condition is satisfied. The game end condition can be changed depending on the game. For example, the game end condition is that an elapsed time from the beginning of the game has reached a time limit, a score of the user has reached a threshold value, or a mission has been achieved.

The data memory 60 is a storage medium such as HDD or SSD. The data memory 60 stores a game processing program and other programs. The position locator 51, the image processor 52, and the progress manager 53 execute computer-readable instructions described in these programs for the game to progress.

The data memory 60 stores setting information 61, game space data 62, and game progress data 63. The setting information 61 includes boundary information, which is set based on the position of the tracking sensor 22.

The game space data 62 is data for drawing a game-playing space. For example, the game space data 62 includes data for drawing the background of a game field or data for drawing an object in the virtual space. Such an object includes an object such as an enemy that moves in the game field and an object displayed only when a predetermined condition is satisfied. The game space data 62 includes position information of such an object in the virtual space.

The game progress data 63 is used to manage the progress of the game and updated in accordance with the progress of the game. The game progress data 63 includes user attribute information, which is associated with the user. The user attribute information includes at least one of user setting information, user parameters, game media (or game content), and attribute information associated with the game media. User setting information is, for example, the gender, age or age bracket, location, or email address of the user. A user parameter is, for example, a parameter of the virtual character corresponding to the user. A user parameter is, for example, a game result such as a score, the number of times the user has won, or the number of times the user has lost. Alternatively, a user parameter is, for example, a battle parameter such as level, status, competency, skill, ability, attack ability, defense ability, hit point (HP), life, health value, restoration ability, spell, or job. Game media are electronic data (content) used in the game. Game media may be, for example, obtained, possessed, used, managed, exchanged, synthesized, reinforced, sold, abandoned, or donated by the user in the game. Game media include, for example, any medium such as a card, an item, a virtual currency, a ticket, a character, and an avatar. Attribute information of game media is, for example, a parameter of a game medium and is the same as user attribute information. Instead of game media, user parameters or attribute information associated with game media may be, for example, obtained, possessed, used, managed, exchanged, synthesized, reinforced, sold, abandoned, or donated. Further, the game progress data 63 may include enemy-related information. Enemy-related information includes, for example, how easily an enemy can be beaten such as the health value of the enemy.

An input operation device 65 is connected to the game processing device 50 such that data can be transmitted and received. The input operation device 65 is a pointing device such as a mouse, keyboard, or a touch panel unit. The input operation device 65 is connected to the game processing device 50 via a communication cable or in a wireless manner. The input operation device 65 is used by the user or the game manager.

Figure 3:
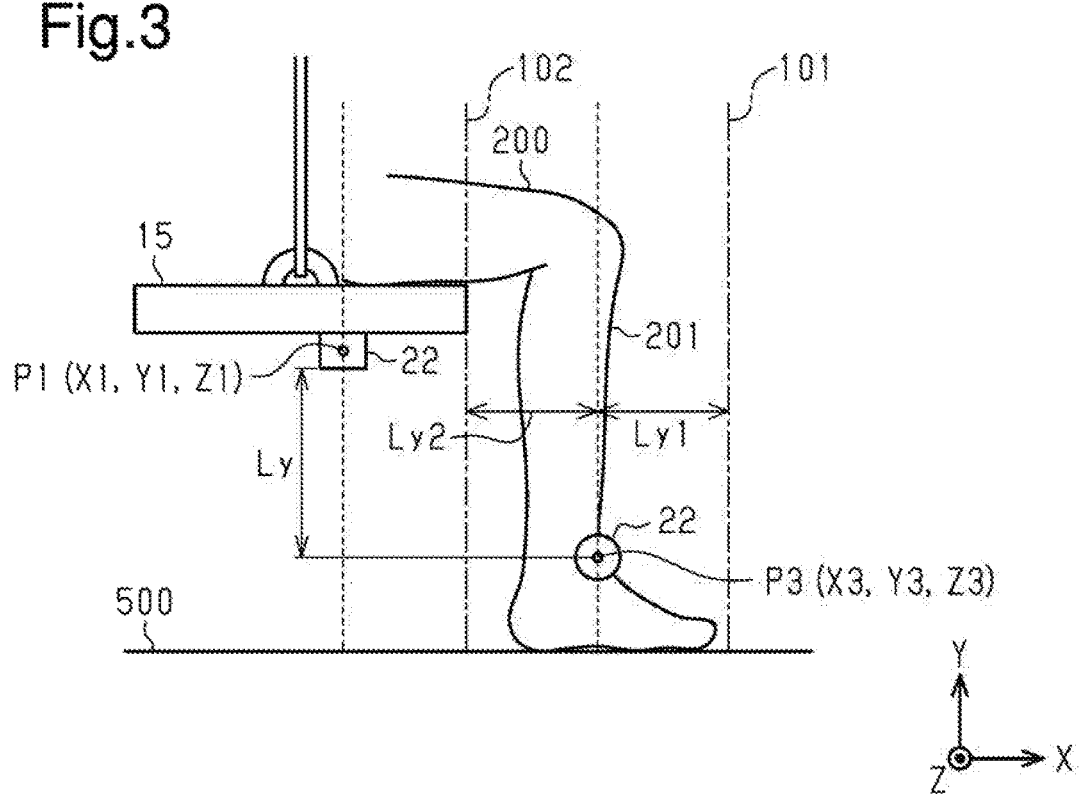
FIG. 3 is a diagram illustrating a method for setting a boundary in the first embodiment.

The method for setting a boundary for determining an action of the user 200 will now be described with reference to FIG. 3. The user 200 is seated on the seat 15 with the tracking sensor 22 attached around each ankle. FIG. 3 shows only the right foot. The bottom surfaces of the feet (shoes) of the user 200 do not necessarily have to be in contact with a floor surface 500.

The game processing device 50 obtains detection data from the tracking sensors 22 to determine the positions of the tracking sensors 22. This allows the game processing device 50 to obtain the position of the tracking sensor 22 attached to the seat 15, the position of the tracking sensor 22 attached to the left foot, and the position of the tracking sensor 22 attached to the right foot. The position of the tracking sensor 22 attached to the seat 15, the position of the tracking sensor 22 attached to the left foot (not shown in FIG. 3), and the position of the tracking sensor 22 attached to the right foot are respectively referred to as a seating position P1 (X1, Y1, Z1), a left foot position P2 (X2, Y2, Z2), and a right foot position P3 (X3, Y3, Z3).

The direction which is parallel to the floor surface 500 and in which the face of the user 200 seated on the seat 15 is oriented is referred to an X-direction (front-rear direction). The direction that is parallel to the floor surface 500 and is orthogonal to the X-direction is referred to as a Z-direction (left-right direction). The normal direction of the floor surface 500 is referred to as a Y-direction (vertical direction). Instead of these directions, any coordinate system can be set for the game processing device 50.

The game processing device 50 calculates a distance Ly between the seating position P1 and the left foot position P2 in the Y-direction or a distance Ly between the seating position P1 and the right foot position P3 in the Y-direction. Instead, the distances Ly may both be calculated. This is used to measure the length of the lower leg of the user 200 from the knee to the ankle. Alternatively, for example, the distance from the Y-coordinate of the seating position P1 to the intermediate position between the Y-coordinate of the left foot position P2 and the Y-coordinate of the right foot position P3 may be calculated.

The game processing device 50 calculates a corrected distance Ly2 by multiplying each distance Ly by a predetermined ratio R2. The ratio R2 is larger than 0 and smaller than 1. Next, the game processing device 50 sets a rear boundary 102 at the position that is located away rearward, which is in the direction opposite to the X-direction, by the corrected distance Ly2 from the left foot position P2 or the right foot position P3, which serves as a reference position. When the distance Ly between the seating position P1 and the left foot position P2 and the distance Ly between the seating position P1 and the right foot position P3 are both calculated, these distances Ly may be used to set a rear boundary 102 for the left foot and a rear boundary 102 for the right foot.

The rear boundary 102 simply needs to indicate the boundary of the X-coordinates. For example, the rear boundary 102 may be a Y-Z plane that is parallel to the Y-direction and the Z-direction with the X-direction set as a normal direction. In one example, the ratio R2 is determined taking into account, for example, a general angle obtained when the user 200 seated on the seat 15 bends the leg rearward (in the direction opposite to the X-direction) by rotating the lower leg with respect to the knee as a preparatory motion for an action of kicking away the shoe object in the virtual space. Basically, the ratio R2 is fixed. Thus, for example, the rear boundary 102 is set at a position located farther from the reference position for a user 200 having a long lower leg than a user 200 having a short lower leg.

In addition, the game processing device 50 calculates a corrected distance Ly1 by multiplying each distance Ly by a predetermined ratio R1. The ratio R1 is larger than 0 and smaller than 1. The ratio R1 may be different from the ratio R2 or may be the same as the ratio R2. While the ratios R1 and R2 are basically fixed, the ratios R1 and R2 can be fitted to users having diverse body forms by setting the ratios R1 and R2 to be adjustable. Subsequently, the game processing device 50 sets a front boundary 101 at the position that is located away frontward, which is in the X-direction, by the corrected distance Ly1 from the left foot position P2 or the right foot position P3, which serves as the reference position. When calculating both the distance Ly in the Y-direction between the seating position P1 and the left foot position P2 and the distance Ly in the Y-direction between the seating position P1 and the right foot position P3, the game processing device 50 may use these distances to set a front boundary 101 for the left foot and a front boundary 101 for the right foot.

The front boundary 101 simply needs to indicate the boundary of the X-coordinates. For example, the front boundary 101 may be a Y-Z plane that is parallel to the Y-direction and the Z-direction with the X-direction set as the normal direction. In one example, the ratio R1 is determined taking into account, for example, a general angle obtained when the user 200 seated on the seat 15 kicks frontward (in the X-direction) by rotating the lower leg with respect to the knee as a motion for the action of kicking away the shoe object in the virtual space. Thus, for example, the front boundary 101 is set at a position located farther from the reference position for a user 200 having a long lower leg than a user 200 having a short lower leg.

The front boundary 101 and the rear boundary 102 set in such a manner reflect the length of the lower leg, which is the body form of the user. For example, in a case in which it is determined whether to execute an action based on changes in the movement direction of the ankle position of the user, the action may be executed at a timing against the user's intention such as a timing at which the user moves the feet a little. In such a case, the user may experience discomfort. Further, when the boundary or the like for determining whether to execute an action is uniform among users, the action is executed easily for some users and the action is not executed easily for other users. In the present embodiment, the boundary is set in accordance with the body form of a user. This allows the action to be executed following the user's intention and reduces the discomfort of the user.

Figure 4:
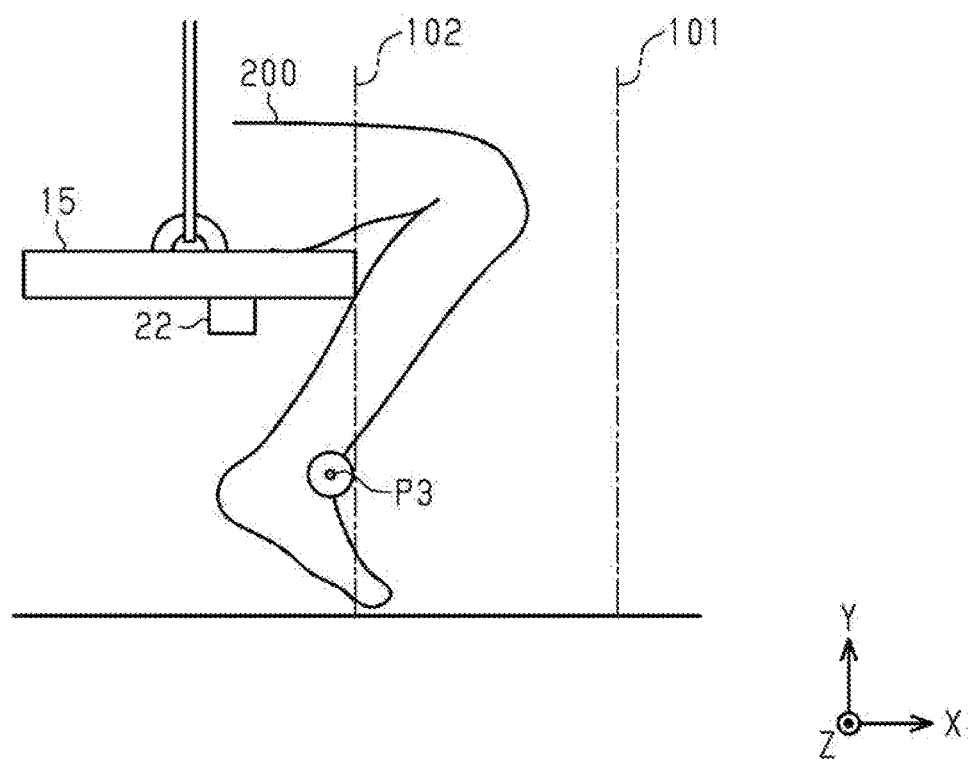
FIG. 4 is a diagram illustrating how the boundary is used in the first embodiment.

The procedure of using the front boundary 101 and the rear boundary 102 for the game to progress will now be described with reference to FIGS. 4 and 5. As described above, back-and-forth swinging of the seat 15 is limited such that the seat 15 swings slightly in accordance with the motion of the user 200. FIGS. 4 and 5 show only the right foot.

As shown in FIG. 4, when starting the kick-the-shoe-on-the-swing game, as preparation for kicking frontward, the user 200 rotates the lower leg with respect to the knee such that the lower leg is located below the seat 15. The game processing device 50 determines the left foot position P2 (not shown) and the right foot position P3 to determine whether at least one of the left foot position P2 and the right foot position P3 has crossed the rear boundary 102.

When determining that at least one of the left foot position P2 and the right foot position P3 has crossed the rear boundary 102, the game processing device 50 determines that the kick-the-shoe-on-the-swing motion has been started.

After determining that the kick-the-shoe-on-the-swing motion has been started, the game processing device 50 determines at least one of the left foot position P2 and the right foot position P3 has crossed the front boundary 101 while determining the left foot position P2 and the right foot position P3.

As shown in FIG. 5, when determining that at least one of the left foot position P2 (not shown) and the right foot position P3 has crossed the front boundary 101, the game processing device 50 determines that the kick-the-shoe-on-the-swing motion is complete. Then, in the virtual space, the game processing device 50 causes the shoe object of the virtual character to move toward the front of the user 200, which is in the kick-out direction, and then fall in accordance with a predetermined trajectory. More specifically, the game processing device 50 causes the shoe object to move and then fall in accordance with the kick-out direction of the user based on the detection data of the tracking sensor 22. For example, when the kick-out direction is oriented toward the front left as viewed from the user 200, the game processing device 50 draws the shoe object to be moved and fallen toward the front left.

The game processing device 50 obtains the speed of the tracking sensor 22 when the kick-the-shoe-on-the-swing motion is complete. This speed is at least one of the speed, angular velocity, acceleration, and the like, which refer to the movement distance per unit of time. The game processing device 50 causes the shoe object to move based on data in which the speed is associated with the movement distance (flying distance) of the object. The speed may be calculated from the distance between a pair of the tracking sensors 22. Alternatively, the speed may be detected using a speed detection sensor incorporated in the tracking sensor 22 or using an external speed detection sensor. When the speed is calculated from the distance, a distance Ly between the tracking sensor 22 attached to the seat 15 and the left foot position P2 or the right foot position P3 is divided by a time T, during which the lower leg is rotated, to obtain the speed V (V=Ly/T). The time T may be a preset time (constant). Alternatively, the time from when the foot crosses the rear boundary 102 to when the foot crosses the front boundary 101 may be measured, and the measured time may be used as the time T.

FIG. 6A is a table serving as an example of data in which the movement speed of the foot is associated with the movement distance of the shoe object. In this table, the speed is associated with the distance such that the distance increases in stages as the speed increases. Further, as shown in the map of FIG. 6B, the speed may be associated with the distance such that the distance increases in a continuous manner as the speed increases. Instead of or in addition to the table, the game processing device 50 may calculate the movement distance using a predetermined arithmetic expression.

FIG. 7 schematically shows an exemplary view 110, which is visually recognized by the user 200. The view 110 displays the image of a virtual space 111. The virtual space 111 displays a shoe object 112 and part of a virtual character 113.

After a single kick-the-shoe-on-the-swing motion is complete and the shoe object 112 moves, the game processing device 50 displays the shoe object 112 again on the foot of the virtual character, thereby enabling the user to perform the kick-the-shoe-on-the-swing motion again. When the fall position or movement trajectory of the shoe object 112 satisfies a score assigning condition, a score is assigned to the user. Further, a score to be assigned may differ depending on the fall position or movement trajectory. Instead, when the fall position or movement trajectory of the shoe object 112 satisfies an achievement condition, the mission is complete.

In this manner, the user is actually seated on the seat 15 of the swing to perform the kick-the-shoe-on-the-swing motion. Thus, the motion of the user causes the seat 15 to swing. Further, when the swinging is detected by the HMD 30, the game processing device 50 moves the image displayed in the HMD 30 in accordance with the actual swinging. This reduces VR motion sickness and allows the user to have a sense of immersion as if the user performs the kick-the-shoe-on-the-swing motion riding on a virtual swing.

The procedure of the game processing of the present embodiment will now be described.

Figure 8:
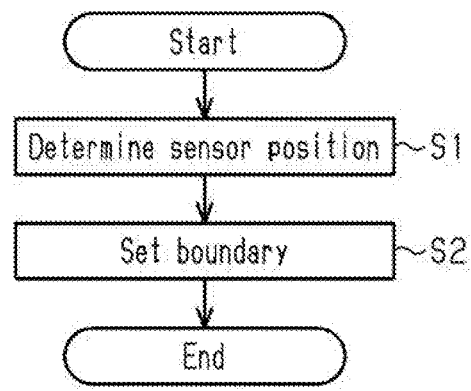
FIG. 8 is a flowchart illustrating a procedure of setting the boundary in the first embodiment.

The procedure of setting a boundary will now be described with reference to FIG. 8. The game processing device 50 obtains detection data from the tracking sensor 22 and the like to determine the position of the tracking sensor 22 (sensor position) (step S1). More specifically, the game processing device 50 determines the seating position P1, the left foot position P2, and the right foot position P3.

When determining that a new game is being started or that a new user is starting the game, the game processing device 50 sets a boundary based on the position of the tracking sensor 22 (step S2). More specifically, the seating position P1 and at least one of the left foot position P2 and the right foot position P3 are used to set the front boundary 101 and the rear boundary 102. The front boundary 101 and the rear boundary 102 may be common to both feet or may be set separately for each foot. The position information of the front boundary 101 and the position information of the rear boundary 102 are stored as the setting information 61 in the data memory 60. The position information of the front boundary 101 and the position information of the rear boundary 102 may be stored in association with identification information of the user. When the game is played by the user who has set the position information of the front boundary 101 and the position information of the rear boundary 102, the position information of the front boundary 101 and the position information of the rear boundary 102 may be read from the data memory 60. The game may be played using the read position information.

Figure 9:
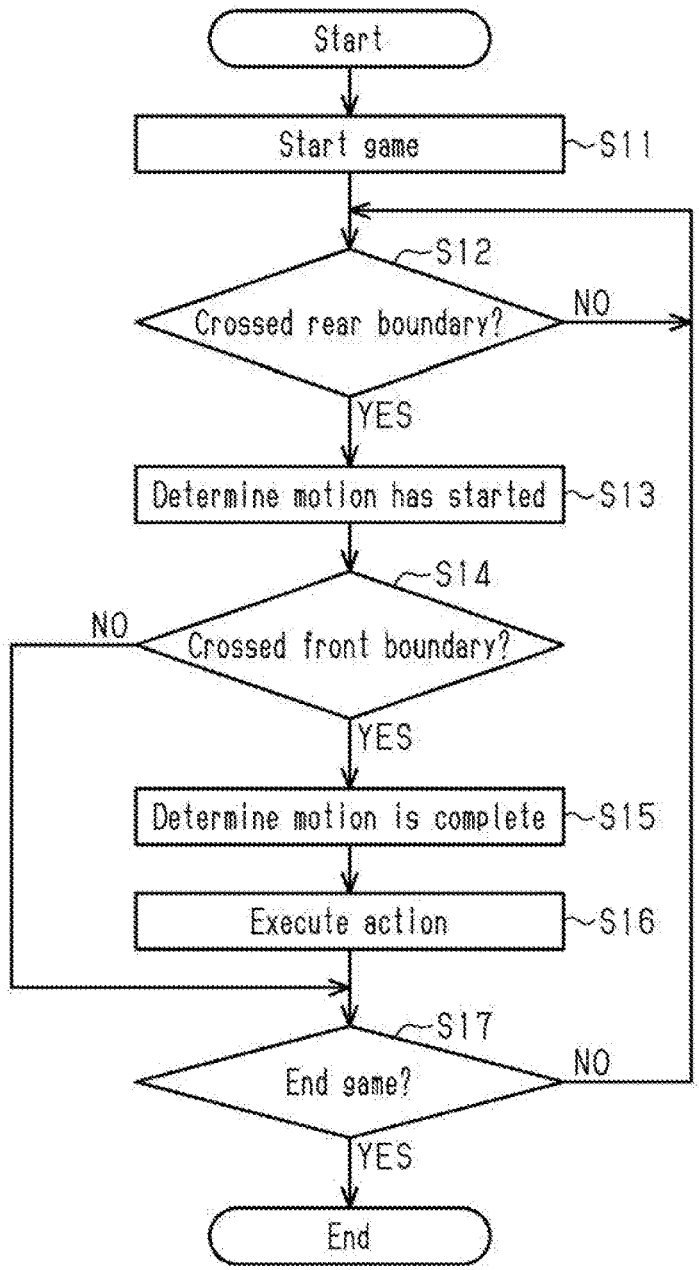
FIG. 9 is a flowchart illustrating the progress of the game in the first embodiment.

The procedure of causing the game to progress will now be described with reference to FIG. 9. The game processing device 50 starts the game based on a trigger such as an input operation by the input operation device 65 (step S11). For example, the game processing device 50 performs initialization such as resetting of the position information of the boundary used in the last game. Further, the game processing device 50 obtains the detection data of the measurement device 32 of the HMD 30, and displays the image of a display range corresponding to the detection data.

While causing the game to progress based on the game progress data 63, the game processing device 50 determines whether the left foot position P2 or the right foot position P3 has crossed the rear boundary 102 based on the position information of the rear boundary 102 (step S12). When determining that the left foot position P2 or the right foot position P3 has not crossed the rear boundary 102 (step S12: NO), the game processing device 50 proceeds to step S12.

When determining that the left foot position P2 or the right foot position P3 has crossed the rear boundary 102 (step S12: YES), the game processing device 50 determines that the corresponding leg has started the kick-the-shoe-on-the-swing motion (step S13).

While causing the game to progress, the game processing device 50 determines whether the left foot position P2 or the right foot position P3 has crossed the front boundary 101 (step S14). When determining that the left foot position P2 or the right foot position P3 has not crossed the front boundary 101 (step S14: NO), the game processing device 50 proceeds to step S17. In step S14, it may be determined whether the left foot position P2 or the right foot position P3 has crossed the front boundary 101 within a predetermined time such as one or two seconds. When determining that the left foot position P2 or the right foot position P3 has not crossed the front boundary 101 within the predetermined time (step S14: NO), the game processing device 50 may proceed to step S17.

When determining that at least one of the left foot position P2 and the right foot position P3 has crossed the front boundary 101 (step S14: YES), the game processing device 50 determines that the kick-the-shoe-on-the-swing motion is complete (step S15).

Subsequently, the game processing device 50 executes the action of kick-the-shoe-on-the-swing motion in the virtual space (step S16). In this case, the game processing device 50 uses the map of FIG. 6B to calculate the movement distance of the shoe object from the movement speed. For example, the game processing device 50 draws the leg of the leg of the virtual character and the shoe object, and draws the shoe object to be moved and then fallen along a parabola in the kick-out direction in accordance with the calculated movement distance. Further, the game processing device 50 draws a new shoe object on the foot of the virtual character after the shoe object moves away from the foot of the virtual character.

The game processing device 50 determines whether the game has ended based on the game end condition (step S17). When determining that the end condition is satisfied (step S17: YES), the game processing device 50 ends the game. When the end condition is not satisfied (step S17: NO), the game processing device 50 returns to the step S12.

The first embodiment has the following advantages.

(1) The distance between the tracking sensor 22 attached to the foot of the user and the tracking sensor 22 attached to the housing 11 is calculated to set the front boundary 101 and the rear boundary 102 based on the calculated distance. Thus, the positions of the front boundary 101 and the rear boundary 102 are set in accordance with the body form of the user. Further, when the positional relationship between the tracking sensor 22 attached to the user and the front boundary 101 or the rear boundary 102 satisfies the predetermined condition, the action corresponding to the motion of the user is executed in the virtual space. The position of the real world where the motion of the user is started differs depending on the body form of the user. Thus, the use of the boundary reflecting the body form of the user restricts the action from being executed against the user's intention, thereby reducing the discomfort of the user.

(2) The game processing device 50 obtains the speed when the tracking sensor 22 attached to the foot of the user crosses the front boundary 101. Further, the magnitude of the speed is reflected on the movement distance of the shoe object of the kick-the-shoe-on-the-swing motion. This allows the user to adjust the movement distance of the shoe object in the virtual space by adjusting the movement speed of the foot. Thus, the game can be diversified, for example, scores are assigned in accordance with the fall position of the shoe object and scores are assigned in accordance with the movement distance.

(3) The game processing device 50 moves the shoe object from the foot of the virtual character in the virtual space when the tracking sensor 22 attached to the foot of the user crosses the front boundary 101. Thus, the timing at which the movement of the object is started can be approximated to a timing that is intended by the user. Thus, the user can intuitively perform the motion of kicking as an input operation.

(4) The tracking sensor 22 is attached to the foot of the user. This allows the motion of the leg to be reflected on an action in the virtual space. Thus, a novel game can be provided.

Second Embodiment

A system of displaying an image according to a second embodiment will now be described. The second embodiment is the same as the first embodiment in the method for setting a boundary. The second embodiment is different from the first embodiment in how the set boundary is used. Like or the same reference numerals are given to those components that are like or the same as the corresponding components of the first embodiment.

In the second embodiment, the front boundary 101 and the rear boundary 102 are used to determine whether to start moving an object in the virtual space. More specifically, when the positional relationship between the left foot position P2 and the right foot position P3 with at least one of the front boundary 101 and the rear boundary 102 satisfies a predetermined condition, the game processing device 50 moves a seat object, which corresponds to the seat 15, and the virtual character. Further, a user perspective in the virtual space corresponds to the perspective of the virtual character.

Thus, as the virtual character moves, the user perspective in the virtual space moves. Conventional methods for moving a virtual character include a method for causing the virtual character and the like to move in the virtual space as the user perspective moves in the real world and a method for causing the virtual character and the like to automatically move in accordance with a game story. Alternatively, for example, the user in the real world operates a controller, which is held by himself or herself, and uses a graphical user interface (GUI) such as an icon in the virtual space to instruct the virtual character to move. In the former case, the virtual character may move against the user's intention. In the latter case, movement of the virtual character toward a target position requires a movement instruction using a GUI such as in icon that does not exist in the real world by operating the controller. This may reduce a sense of immersion. In the present embodiment, the user causes the virtual character to move by moving the legs while riding on the swing. This allows the user to move the virtual character with motions that are more intuitive than the conventional methods. Instead of or in addition to the seat object and the virtual character, the object to be moved may be the entirety of a housing object in the virtual space, which corresponds to the housing 11. Further, in the present embodiment, movement of the seat object and the virtual character is determined in a mode (fly mode), which differs from a mode of performing the kick-the-shoe-on-the-swing motion (kick mode).

The front boundary 101 and the rear boundary 102 shown in FIGS. 10A to 12 simply need to indicate the boundary in the X-direction. For example, the front boundary 101 and the rear boundary 102 are Y-Z planes in which the X-direction is a normal direction. The game processing device 50 determines whether the left foot position P2 (not shown) and the right foot position P3 (not shown) have both crossed the same boundary.

As shown in FIG. 10A, when determining that both feet have crossed the front boundary 101, the game processing device 50 determines the direction in which the user 200 has stretched the legs. When determining that the leg-stretching direction is the X-direction, which is oriented to the front surface of the user, the game processing device 50 causes the seat object and the virtual character in the virtual space to move rearward (in the direction opposite to X-direction), which is the direction opposite to the leg-stretching direction. In this case, the game processing device 50 may cause the seat object and the virtual character 113 to horizontally move rearward or to swing rearward. In this manner, the object is moved and displayed in the direction opposite to the direction in which the user has thrusted the legs. The reaction of the motion of the virtual character produces thrust, thereby causing the user to imagine as if the seat object and the virtual character are moving.

The method by which the game processing device 50 determines the direction in which the user has stretched the legs is not particularly limited. For example, the leg-stretching direction may be determined with reference to the left foot position P2 when setting the boundary before the game starts. Instead, the direction in which the left foot position P2 has been stretched or the direction in which the right foot position P3 has been stretched may be determined with reference to the seating position P1. Alternatively, the leg-stretching direction may be determined by calculating the median value of the left foot position P2 and the right foot position P3 and using the direction from the seating position P1, which serves as a reference, to the median value.

As shown in FIG. 10B, when determining that the left foot position P2 (not shown) and the right foot position P3 (not shown) have both crossed the front boundary 101 and the user 200 has stretched both legs toward the front left, the game processing device 50 causes the seat object and the virtual character 113 to move toward the rear right in the virtual space.

As shown in FIG. 10C, when determining that the left foot position P2 (not shown) and the right foot position P3 (not shown) have both crossed the front boundary 101 and the user 200 has stretched both legs toward the front right, the game processing device 50 causes the seat object and the virtual character 113 to move toward the rear left in the virtual space.

In FIGS. 10A and 10B, the seat object and the virtual character 113 move in the direction opposite to the direction in which the user has stretched the legs. Instead, the seat object and the virtual character 113 may move in the same direction as the leg-stretching direction. For example, when the user thrusts both legs toward the front of him or her, the seat object and the virtual character 113 may move frontward. Further, when the user has stretched both legs toward the front left, the seat object and the virtual character 113 may move toward the front left.

Further, the seat object and the virtual character 113 do not have to move in the above-described direction. For example, the seat object and the virtual character 113 may move in the right direction or in the left direction (immediately beside the user). For example, when the user stretches the legs by an angle that is greater than or equal to a predetermined angle from the front, which serves as a reference, toward the right, the seat object and the virtual character 113 may move in the right direction. Further, when the user stretches the legs by an angle that is greater than or equal to the predetermined angle toward the left, the seat object and the virtual character 113 may move in the left direction.

Figure 11A:
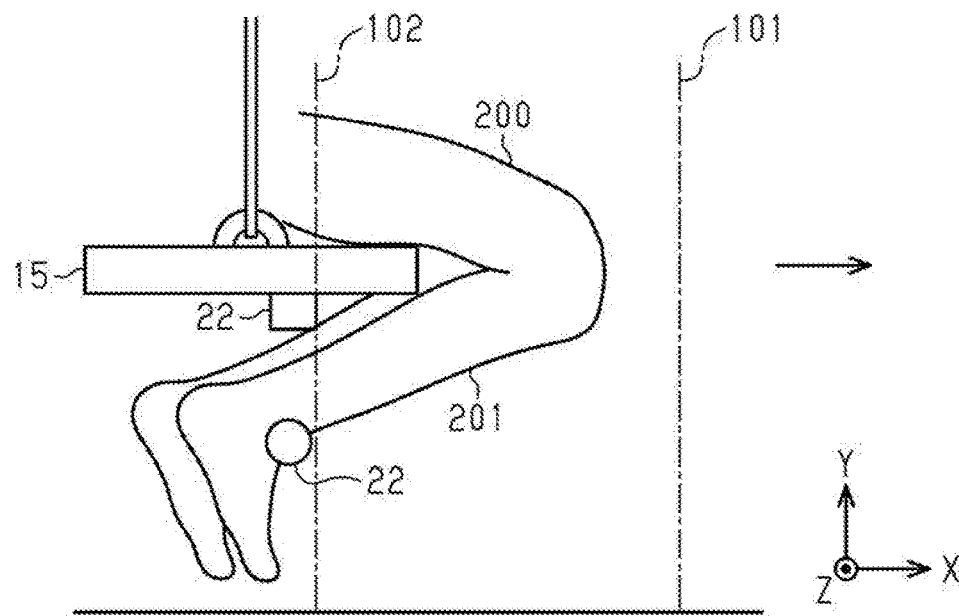
FIG. 11A is a diagram showing movement of the object toward the front when a boundary is used in a system of displaying an image according to the second embodiment.

As shown in FIG. 11A, when determining that the user 200 has bent the legs to position the lower legs below the seat 15 and the left foot position P2 (not shown) and the right foot position P3 (not shown) have crossed the rear boundary 102, the game processing device 50 determines the direction of the lower legs. When determining that the direction in which the lower legs stretch is opposite to the X-direction, the game processing device 50 causes the seat object and the virtual character 113 to move frontward, which is in the X-direction, in the virtual space.

Figure 11B:
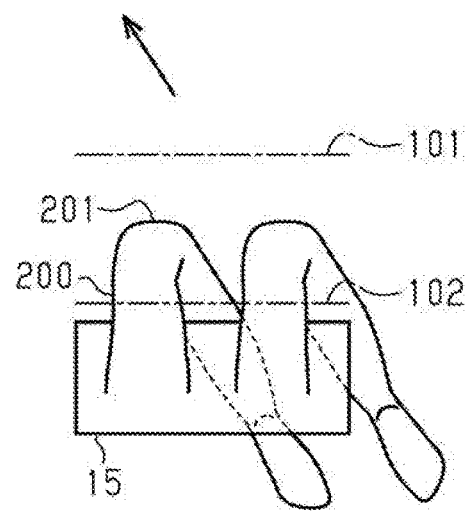
FIG. 11B is a diagram showing movement of the object toward the front left when the boundary is used in the system according to the second embodiment.

As shown in FIG. 11B, when determining that the left foot position P2 (not shown) and the right foot position P3 (not shown) have both crossed the rear boundary 102, the game processing device 50 determines the direction of the lower legs. When determining that the lower legs are directed toward the rear right, the game processing device 50 causes the seat object and the virtual character to move toward the front left.

Figure 11C:
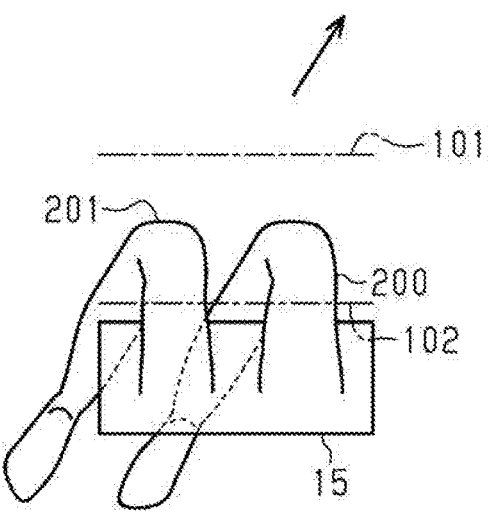
FIG. 11C is a diagram showing movement of the object toward the front right when the boundary is used in the system according to the second embodiment.

As shown in FIG. 11C, when determining that the left foot position P2 (not shown) and the right foot position P3 (not shown) have both crossed the rear boundary 102, the game processing device 50 determines the direction of the lower legs. When determining that the lower legs are directed toward the rear left, the game processing device 50 causes the seat object and the virtual character to move toward the front right.

When the user 200 bends the right leg while stretching the left leg and bends the left leg while stretching the right leg to kick out the left leg and the right leg alternately, the seat object and the virtual character move in the Y-direction, which is oriented toward the upper side, in the virtual space.

Figure 12:
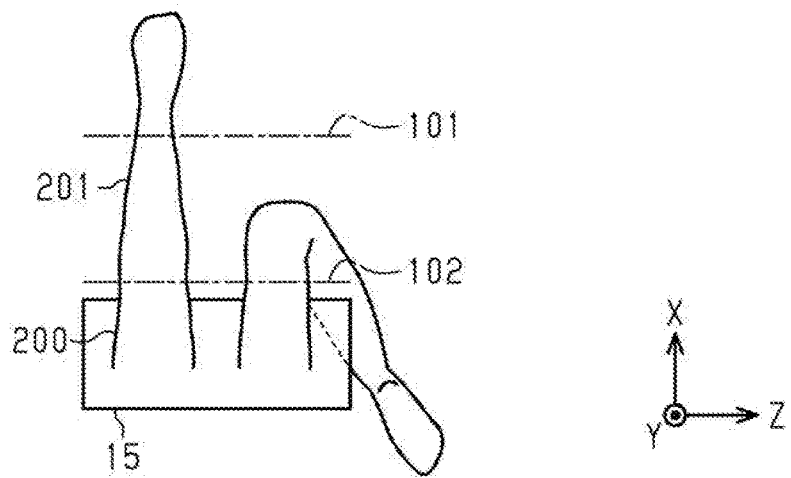
FIG. 12 is a diagram showing an upward movement of the object when the boundary is used in the second embodiment.

As shown in FIG. 12, when determining that the left foot position P2 (not shown) has crossed the front boundary 101 and the right foot position P3 (not shown) has crossed the rear boundary 102, the game processing device 50 draws the seat object and the virtual character that move upward. While a state in which one of the feet is over the front boundary 101 and the other one of the feet is over the rear boundary 102 is repeated within a predetermined time, drawing of the seat object and the virtual character that move upward is continued. When the number of times one of the feet has crossed the front boundary 101 and the other one of the feet has crossed the rear boundary 102 has reached a predetermined number of times, the seat object and the virtual character 113 that move upward may start to be drawn.

Figure 13:
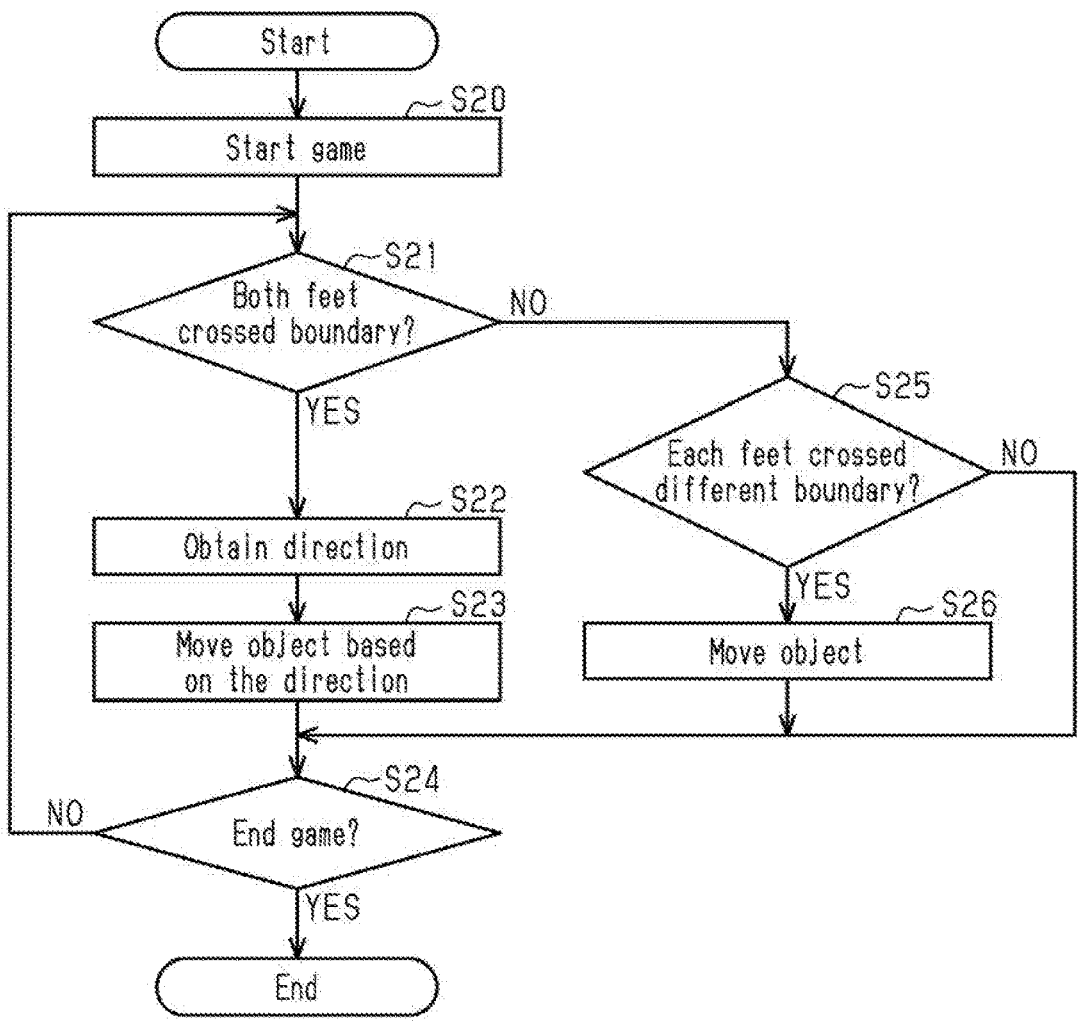
FIG. 13 is a flowchart illustrating the progress of the game in the second embodiment.

The procedure of the game processing according to the second embodiment will now be described with reference to FIG. 13.

When starting the game (step S20), the game processing device 50 performs initialization such as resetting of the history of the last time. Then, the game processing device 50 determines whether both feet have crossed the same boundary (step S21).

When determining that both feet have crossed one of the front boundary 101 and the rear boundary 102 (step S21: YES), the game processing device 50 obtains the direction in which the legs (lower legs) have been stretched (step S22). Subsequently, the game processing device 50 displays, on the HMD 30, an image in which the seat object and the virtual character have been moved based on the obtained direction (step S23).

In step S21, when determining that both feet of the user have not crossed the same boundary (step S21: NO), the game processing device 50 determines whether each of the feet has crossed a different boundary (step S25). When determining that each of the feet of the user has crossed a different boundary (step S25: YES), the game processing device 50 displays, on the HMD 30, an image in which the seat object and the virtual character have been moved upward (step S26), thereby proceeding to step S24. When determining that each of the feet has not crossed a different boundary (step S25: NO), the game processing device 50 proceeds to step S24.

The game processing device 50 determines whether the game has been ended (step S24). When determining that the game has been ended (step S24: YES), the process is ended. When determining that the game has not been ended (step S24: NO), the process returns to step S21.

The second embodiment has the following advantages.

(5) When the user stretches or bends the legs such that the predetermined condition is satisfied by the positional relationship of the left foot position P2 and the right foot position P3 with at least one of the front boundary 101 and the rear boundary 102, the seat object and the virtual character move. This allows the user to move the virtual character in the virtual space with intuitive operations at his/her own intentional timing.

(6) When the left foot position P2 and the right foot position P3 crosses the front boundary 101, the game processing device 50 causes the seat object and the virtual character to move rearward, that is, in the direction opposite to the direction in which both legs are stretched. Further, when the left foot position P2 and the right foot position P3 cross the rear boundary 102, the game processing device 50 causes the seat object and the virtual character to move forward, that is, in the direction opposite to the direction in which both legs are bent. Such use of the boundary reflecting the body form of the user restricts the action from being executed against the user's intention.

(7) The game processing device 50 changes how the seat object and the virtual character move depending on the difference in the positional relationship with the boundary of the left foot position P2 and the right foot position P3. That is, when the left foot position P2 and the right foot position P3 both cross the same boundary, the game processing device 50 causes the seat object and the virtual character to move rearward or frontward. By contrast, when the left foot position P2 and the right foot position P3 cross different boundaries, the game processing device 50 causes the seat object and the virtual character to move upward. Thus, the boundary can be used for determining the types of actions.

The above-described embodiments may be modified as follows. The above-described embodiments and the following modifications can be combined as long as the combined modifications remain technically consistent with each other.

In each of the above-described embodiments, the tracking sensor 22 is attached around the ankle of the user. Instead of or in addition to this, the value of detection data of the tracking sensor 22 attached to a position of the body of the user other than around the ankle may be reflected on an action. For example, in a flying mode, the movement speeds, movement distances, and the like of the seat object and the virtual character may be increased based on detection data of the tracking sensor 22 attached to the position of any part of the upper body including the head of the user. Further, in the kick mode, the motion of the upper body may be reflected on the action. For example, the movement distance of the shoe object may be increased in accordance with the motion of the upper body of the user. Furthermore, in the flying mode, in a case in which the left foot position P2 and the right foot position P3 cross the front boundary 101 and the position of the tracking sensor 22 attached to the head of the user or the position of the tracking sensor 22 attached to a position of the upper body other than the head moves to a position located rearward from an initial position when starting the game, that is, in a case in which the head or the upper body other than the head is inclined in the direction opposite to the leg-stretching direction, the action may be reflected by increasing the movement speeds, movement distances, and the like of the seat object and the virtual character.

In each of the above-described embodiments, the tracking sensor 22 attached around the ankle of the user is used to determine whether to start executing an action and whether to complete the executed action. Instead of or in addition to this, the tracking sensor 22 attached to a position of the body of the user other than around the ankle may be used to determine at least one of whether to start executing an action and whether to complete the executed action.

Figure 14A:
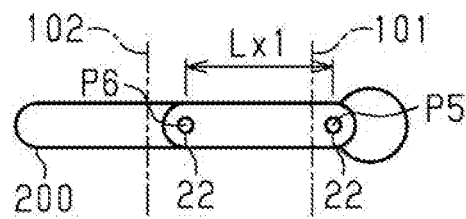
FIG. 14A is a diagram illustrating the setting of a boundary when the boundary is used in a system of displaying an image according to a modification.

An exemplary procedure of executing an action of throwing an object in the virtual space using the tracking sensor 22 attached to the arm will now be described with reference to FIGS. 14A to 14C. As shown in FIG. 14A, the tracking sensors 22 are attached to the elbow and wrist of the user 200, respectively. The game processing device 50 determines a wrist position P5 and an elbow position P6 based on the data obtained from at least one of the tracking sensors 22 and the tracking assistance devices 21. Based on the distance between the tracking sensors 22, the game processing device 50 calculates the length from the elbow to the wrist of the user 200, that is, a length Lx1 of the forearm. Further, the game processing device 50 sets the rear boundary 102 at a position located toward the shoulder of the user 200 and away from the wrist position P5 by a length obtained by multiplying the length Lx1 by a predetermined ratio R5. The ratio in this example is greater than or equal to 1. In addition, the game processing device 50 sets the front boundary 101 at a position toward the elbow and away from the wrist position P5 by a length obtained by multiplying the length Lx1 by a predetermined ratio R6.

Figure 14B:
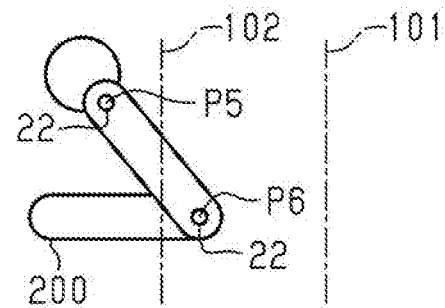
FIG. 14B is a diagram illustrating the determination of whether a motion has started when the boundary is used in the system according to the modification.

As shown in FIG. 14B, the game processing device 50 determines whether the wrist position P5 has crossed the rear boundary 102. When determining that the wrist position P5 has crossed the rear boundary 102, the game processing device 50 determines that the motion has started. The action corresponding to this motion is, for example, to throw an object like a ball or cast an object such as a fishing lure in a water surface. Instead of throwing an object, for example, the action may be bending the arm such as hitting a ball or dancing.

Figure 14C:
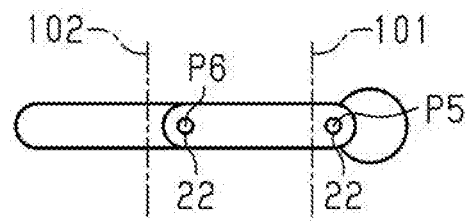
FIG. 14C is a diagram illustrating the determination that the motion is complete when the boundary is used in the system according to the modification.

As shown in FIG. 14C, the game processing device 50 determines whether the wrist position P5 has crossed the front boundary 101 after the motion starts. When determining that the wrist position P5 has crossed the front boundary 101, the game processing device 50 determines that the motion is complete. Next, the game processing device 50 causes the action to be reflected in the virtual space. For example, in the case of casting, the game processing device 50 causes a lure to move frontward in accordance with the calculated trajectory. In the case of throwing a ball, the game processing device 50 causes the ball to move frontward in accordance with the calculated trajectory.

Instead of the length of the forearm, the length of the entire arm or the length of the upper arm may be used to set a boundary. To calculate the length of the entire arm, the tracking sensors 22 are attached to the wrist and the shoulder. To calculate the length of the upper arm, the tracking sensors 22 are attached to the elbow and the shoulder. The game processing device 50 calculates the length of the entire arm or the length of the upper arm and multiplies the calculated length by a predetermined ratio to set a boundary with reference to the position of the wrist, shoulder, or elbow. The boundary set in this manner can be used to determine whether to execute the motion of rotating the entire arm or an action corresponding to the motion of bending the arm. The determination of whether movement has started, determination of whether movement is complete, determination of the type of motion, and the like may be performed in a game of, for example, playing golf, baseball, tennis, and table tennis.

In each of the above-described embodiments, the game provided by the system is played by a user in a sitting position. Instead, the user may play the game in a standing position.

Figure 15A:
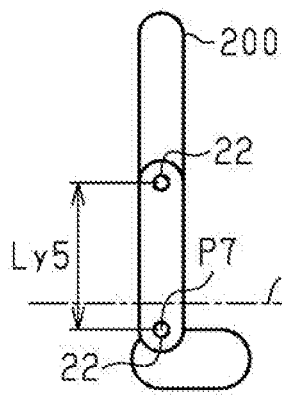
FIG. 15A is a diagram illustrating the setting of a boundary when the boundary is used in a system of displaying an image according to a further modification.

As shown in FIG. 15A, the game processing device 50 calculates a length Ly5 of the lower leg based on the position of the tracking sensor 22. Further, the game processing device 50 sets a boundary 120 at a position located toward the knee of the user 200 and away from an ankle position P7 by a length obtained by multiplying the length Ly5 of the lower leg by a predetermined ratio R7. The ratio R7 in this example is less than 1.

Figure 15B:
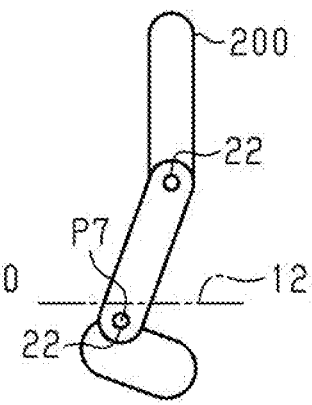
FIG. 15B is a diagram illustrating the determination of the type of action when an ankle position is located below the boundary when the boundary is used in the system according to the modification.

As shown in FIG. 15B, in a game including an action of kicking an object such as soccer, the game processing device 50 may determine that the action intended by the user is dribbling when the user starts the motion of kicking from the ankle position P7, which is lower than the boundary 120.

Figure 15C:
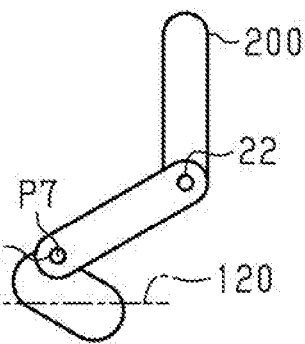
FIG. 15C is a diagram illustrating the determination of the type of action when the ankle position is located above the boundary when the boundary is used in the system according to the modification.

As shown in FIG. 15C, the game processing device 50 may determine that the action intended by the user is shooting when the user starts the motion of kicking from the ankle position P7, which is higher than the boundary 120.

In the second embodiment, a predetermined action is executed in the virtual space when a predetermined condition is satisfied by the positional relationship between the tracking sensor 22 attached around the ankle and the boundary that has been set in advance. Instead of or in addition to this, the virtual character or the like may be moved using the tracking sensor 22 attached to a position of the body of the user other than around the ankle. For example, the virtual character or the like may be moved when the predetermined condition is satisfied by the positional relationship between the tracking sensor 22 attached to the position of any part of the upper body and the boundary set for the upper body. Alternatively, the virtual character or the like may be moved when the predetermined condition is satisfied by the positional relationship between the tracking sensor 22 attached to the head and the boundary set for the head. The movement of the virtual character or the like may be any one of, for example, upward movement, downward movement, leftward movement, and rightward movement. In another option, the movement of the virtual character or the like may be movement in the movement direction of the upper body or movement in other directions.

In each of the above-described embodiments, it is determined that a motion has started when the left foot position P2 or the right foot position P3 crosses the rear boundary 102, and it is determined that the motion is complete when the left foot position P2 or the right foot position P3 crosses the front boundary 101. Instead, when the left foot position P2 or the right foot position P3 crosses the rear boundary 102, the kick-the-shoe-on-the-swing motion or the like may be executed. As another option, when the left foot position P2 or the right foot position P3 crosses the front boundary 101, the kick-the-shoe-on-the-swing motion or the like may be executed. This reduces processing load in the determination process for an action.

In the second embodiment, while a state in which one of the feet is over the front boundary 101 and the other one of the feet is over the rear boundary 102 is repeated within a predetermined time, the seat object and the virtual character that move upward are drawn. Instead of or in addition to this, when the positional relationship between the tracking sensor 22 of one of the feet and the front boundary 101 satisfies a predetermined condition and the positional relationship between the tracking sensor 22 of the other one of the feet and the rear boundary 102 satisfies a predetermined condition, a seat object and a virtual character that are moving downward may be drawn. Alternatively, when the positional relationship between the tracking sensor 22 of one of the feet and the front boundary 101 or the rear boundary 102 satisfies a predetermined condition or when the positional relationship between the tracking sensors 22 of both feet and the front boundary 101 or the rear boundary 102 satisfies a predetermined condition, a seat object and a virtual character that are moving downward may be drawn. The motion of the user is not particularly limited. Instead of moving the legs alternately, for example, the motion may be to move both legs simultaneously back and forth, move both legs simultaneously from side to side, or pedal a bike using both legs. Alternatively, instead of one of upward movement and downward movement, a seat object and a virtual character that repeatedly move upward and downward may be drawn.

In each of the above-described embodiments, the movement distance of the shoe object may be changed in accordance with the length of the lower leg. For example, the movement distance of the shoe object may be corrected to be longer when the lower leg is long than when the lower leg is short. When the speed is fixed, the centrifugal force produced by rotating the lower leg with respect to the knee increases as the length of the lower leg increases. Thus, when the movement distance of the shoe object is increased as the length of the lower leg increases, the motion becomes close to a phenomenon in the real world. Conversely, the movement distance of the shoe object may be corrected to be shorter when the lower leg is long than when the lower leg is short.

In each of the above-described embodiments, when at least one of the left foot position P2 and the right foot position P3 crosses the rear boundary 102, it is determined that the motion corresponding to the kick-the-shoe-on-the-swing motion has started. Instead, when at least one of the left foot position P2 and the right foot position P3 is on the rear boundary 102, it may be determined that the motion has started. Likewise, when at least one of the left foot position P2 and the right foot position P3 crosses the front boundary 101, it is determined that the motion corresponding to the kick-the-shoe-on-the-swing is complete. Instead, when at least one of the left foot position P2 and the right foot position P3 is on the front boundary 101, it may be determined that the motion is complete.

In each of the above-described embodiments, the seat 15, which is a swing, slightly swings in the front-rear direction. Instead, the seat 15 may be swung back and forth when the user performs the motion of riding on the swing. This allows for determination of the kick-the-shoe-on-the-swing motion of the user by moving the front boundary 101 and the rear boundary 102 with reference to the seating position P1.

In each of the above-described embodiments, the length from the seating position P1 to the left foot position P2, which is the ankle position, or the length from the seating position P1 to the right foot position P3, which is the ankle position, is calculated as the length of the lower leg. Instead, when the height of the seat 15 is changed by adjusting the hanging portion 13 such that the foot of the user 200 is in contact with the floor surface 500, the height of the seating position P1 may be calculated as the length of the lower leg.

In each of the above-described embodiments, the length of the lower leg of the user is calculated. Instead, the length of the thigh of the user may be calculated. The length of the thigh can be approximated between the coordinates of the seating position P1 and the coordinates of the left foot position P2 or the right foot position P3. When the thigh is long, the length of the lower leg is expected to be long. Thus, the boundary may be set based on the length of the thigh. In this case, the boundary can be set in accordance with the body form of the user.

In each of the above-described embodiments, the boundary is set with reference to the left foot position P2 or the right foot position P3. Instead of or in addition to this, the boundary may be set with reference to a tracking sensor 22 that is not attached to the body of the user, such as the tracking sensor 22 attached to the seat 15.

In each of the above-described embodiments, it is determined that the motion has started when the foot position crosses the rear boundary 102 and it is determined that the motion is complete when the foot position crosses the front boundary 101. Instead of or in addition to this, the type of motion of the user may be determined based on the positional relationship between the leg or arm and the boundary. For example, in a baseball game, the motion of hitting, the motion of pitching, and the like may be determined based on the positional relationship between the arm and the boundary. In a dance game, turning, jumping, and the like may be determined based on the positional relationship between the leg or arm and the boundary.

In each of the above-described embodiments, the front boundary 101 and the rear boundary 102 are set with reference to the foot of the user. Instead of or in addition to this, an upper boundary and a lower boundary that indicate the boundary in the Y-direction may be set in FIG. 3. Alternatively, a left boundary and a right boundary that indicate the boundary in the Z-direction may be set. Further, the number of boundaries may be one or may be three or more. In addition, the boundary does not have to be a plane but may be a dot or a line.

In each of the above-described embodiments, when the left foot position P2 or the right foot position P3 of the user crosses any one of the front boundary 101 and the rear boundary 102, it is determined that the positional relationship satisfies a predetermined condition. Instead, the game processing device 50 may determine whether to execute an action based on whether the foot position is moving toward or away from the boundary.

In each of the above-described embodiments, the tracking system 20, which serves as one example, causes the tracking assistance devices 21, which serve as laser oscillators, and the tracking sensors 22, which serve as optical receivers, to cooperate with each other. As long as the positions and orientations of the tracking sensors 22 are detectable, other tracking systems 20 may be employed. For example, an outside-in tracking system other than the above-described embodiments may be used. In the outside-in tracking system, for example, an assistance device, which serves as an optical receiver, is provided in a gameplay space. The assistance device cooperates with the tracking sensor 22, which serves as a laser oscillator, to calculate the position and orientation of the tracking sensor 22. Instead, an inside-out tracking system may be used. This system is a sensor incorporated in the tracking sensor 22 to determine the position of the user by scanning the real space.

In each of the above-described embodiments, the HMD 30, which includes an optical receiver, and the tracking assistance devices 21, which include laser oscillators, cooperate with each other to detect the position and orientation of the HMD 30. Instead, a HMD 30 including a laser oscillator and tracking assistance devices 21 including optical receivers may cooperate with each other to detect the position and orientation of the HMD 30. Alternatively, the inside-out tracking system may be used.

In each of the above-described embodiments, the display used by a user, which serves as an example, is the HMD 30. Instead of or in addition to this, the display does not have to be attached to the body of the user. The display may be, for example, an installment-type display, a display for a mobile game device, or a display incorporated in an arcade game. When such displays are used, signals based on the operation of the user may be received from the input operation device (controller) to change the display range in the display.

In each of the above-described embodiments, the HMD 30 is a device separate from the game processing device 50. Instead, the game processing device 50 may be equipped with the HMD 30. Further, the HMD 30 may be a standalone HMD including a device that detects its position.

In each of the above-described embodiments, one example of the housing is a swing. Instead, the housing may include a seat on which the user is seated. Alternatively, in the housing, the user may perform a motion in a standing or lying position. The housing may be, for example, a vehicle such as an automobile, bicycle, airplane or flying object, submarine, roller coaster, or rocket. Instead, the housing may have a gun or bazooka that can shoot. As another option, the housing may be play equipment such as a slide. Alternatively, the system may provide a game in which the housing 11 is not used or provide an application other than a game.

In each of the above-described embodiments, the system is a system with which the user can play a game. Instead, the system may be, for example, a system for giving experience to the user, a system used to view contents such as a movie, a system that allows the user to interact with other users, a learning system, a training system, or a simulation system for the medical field.

Various changes in form and details may be made to the examples above without departing from the spirit and scope of the claims and their equivalents. The examples are for the sake of description only, and not for purposes of limitation. Descriptions of features in each example are to be considered as being applicable to similar features or aspects in other examples. Suitable results may be achieved if sequences are performed in a different order, and/or if components in a described system, architecture, device, or circuit are combined differently, and/or replaced or supplemented by other components or their equivalents. The scope of the disclosure is not defined by the detailed description, but by the claims and their equivalents. All variations within the scope of the claims and their equivalents are included in the disclosure.

What is claimed is:

1. A system for displaying an image of a virtual space on a display, the system comprising circuitry configured to:
    obtain detection data from a plurality of position detection sensors comprising a first position detection sensor and a second position detection sensor;
    detect a first position by the first position detection sensor;
    detect a second position by the second position detection sensor;
    calculate a distance between the first position and the second position;
    set, based on the distance, a boundary for determining a motion of a user, the boundary dividing a first region from a second region;
    determine, when the motion of the user occurs, whether the first position moves from the first region to the second region over the boundary or whether the first position moves from the first region to the boundary; and
    responsive to the first position moving from the first region to the second region over the boundary or the first position moving from the first region to the boundary, move an object in the virtual space.

2. The system according to claim 1, wherein the first position detection sensor is attached to the user.

3. The system according to claim 1, wherein
    the motion of the user includes a motion in a first direction,
    the boundary comprises a first boundary that is away from the first position detection sensor in the first direction, and
    the circuitry is configured to, responsive to the first position moving from the first region to the second region over the first boundary or the first position moving from the first region to the first boundary, determine that the motion of the user has started.

4. The system according to claim 1, wherein
    the motion of the user includes a motion in a second direction,
    the boundary comprises a second boundary that is away from the first position detection sensor in the second direction, and
    the circuitry is configured to, responsive to the first position moving from the first region to the second region over the second boundary or the first position moving from the first region to the second boundary, determine that the motion of the user is complete.

5. The system according to claim 4, wherein the circuitry is configured to obtain, based on the detection data from the position detection sensors or detection data from a speed detection sensor attached to the user, a speed of the first position detection sensor when the first position crosses or reaches the second boundary and to reflect the obtained speed on the movement of the object.

6. The system according to claim 1, wherein
    the boundary is away from the first position detection sensor in a movement direction of the first position, and
    the circuitry is configured to, responsive to the first position moving from the first region to the second region over the boundary or the first position moving from the first region to the boundary, move the object in a direction corresponding to the movement direction of the first position in the virtual space.

7. The system according to claim 1, wherein the movement of the object differs depending on the positional relationship between the first position and the boundary.

8. The system according to claim 1, wherein at least the first position detection sensor is attached to a foot of the user.

9. The system according to claim 1, wherein
    the circuitry is configured to, responsive to the first position moving from the first region to the second region over the boundary or the first position moving from the first region to the boundary, move the object in a front direction, a rear direction, a left direction, a right direction, an upward direction, or a downward direction in the virtual space.

10. The system according to claim 1, wherein
    the object comprises a first object that corresponds to the user and a second object that does not correspond to the user, and
    the circuitry is configured to, responsive to the first position moving from the first region to the second region over the boundary or the first position moving from the first region to the boundary, move the second object in the virtual space.

11. A method for displaying an image of a virtual space on a display using a computer comprising circuitry, the method comprising:
    obtaining detection data from a plurality of position detection sensors comprising a first position detection sensor and a second position detection sensor;
    detecting a first position by the first position detection sensor;
    detecting a second position by the second position detection sensor;
    calculating a distance between the first position and the second position;
    setting, based on the distance, a boundary for determining a motion of a user, the boundary dividing a first region from a second region;
    determining, when the motion of the user occurs, whether the first position moves from the first region to the second region over the boundary or whether the first position moves from the first region to the boundary; and responsive to the first position moving from the first region to the second region over the boundary or the first position moving from the first region to the boundary, moving an object in the virtual space.

12. A non-transitory computer-readable medium that stores a program, wherein the program, when executed by a computer comprising circuitry, causes the circuitry to:
obtain detection data from a plurality of position detection sensors comprising a first position detection sensor and a second position detection sensor;
detect a first position by the first position detection sensor;
detect a second position by the second position detection sensor;
calculate a distance between the first position and the second position;
set, based on the distance, a boundary for determining a motion of a user, the boundary dividing a first region from a second region;
determine, when the motion of the user occurs, whether the first position moves from the first region to the second region over the boundary or whether the first position moves from the first region to the boundary; and
responsive to the first position moving from the first region to the second region over the boundary or the first position moving from the first region to the boundary, move an object in the virtual space.

* * * * *